US009344886B2

(12) United States Patent
Nakajima

(10) Patent No.: US 9,344,886 B2
(45) Date of Patent: May 17, 2016

(54) COMMUNICATION APPARATUS AND CONTROL METHOD

(71) Applicant: CANON KABUSHIKI KAISHA, Tokyo (JP)

(72) Inventor: Takafumi Nakajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 152 days.

(21) Appl. No.: 13/875,699

(22) Filed: May 2, 2013

(65) Prior Publication Data

US 2013/0298194 A1 Nov. 7, 2013

(30) Foreign Application Priority Data

May 7, 2012 (JP) .................. 2012-106118

(51) Int. Cl.
H04W 12/06 (2009.01)
(52) U.S. Cl.
CPC ..................... H04W 12/06 (2013.01)
(58) Field of Classification Search
None
See application file for complete search history.

(56) References Cited

U.S. PATENT DOCUMENTS

2003/0096641 A1* 5/2003 Odinak ............... H04M 1/6075 455/569.2
2003/0120920 A1* 6/2003 Svensson ...................... 713/168
2008/0092212 A1* 4/2008 Patel et al. .......................... 726/3
2008/0178252 A1* 7/2008 Michaud ............................ 726/1
2009/0215392 A1* 8/2009 Rowse et al. ................. 455/41.2
2010/0066839 A1 3/2010 Azuma
2011/0028126 A1* 2/2011 Lim et al. ....................... 455/411
2011/0047603 A1* 2/2011 Gordon ................... H04L 63/06 726/5
2012/0233688 A1* 9/2012 Tonouchi et al. ................ 726/17

FOREIGN PATENT DOCUMENTS

| JP | 2008-167269 A | 7/2008 |
| JP | 2009-175809 A | 8/2009 |
| WO | 2005/096157 A | 10/2005 |
| WO | WO 2011023070 A1 * | 3/2011 |

OTHER PUBLICATIONS

IEEE Standards Association, Part 11: Wireless LAN Medium Access Control (MAC) and Physical Layer (PHY) Specifications, [Online] IEEE Std 802.11u™-2011, Feb. 25, 2011 [retrieved Nov. 17, 2014], <URL: http://ieeexplore.ieee.org/stamp/stamp.jsp?arnumber=5721908 >.*

* cited by examiner

Primary Examiner — Hadi Armouche
Assistant Examiner — Malcolm Cribbs
(74) Attorney, Agent, or Firm — Canon USA, Inc. IP Division

(57) ABSTRACT

A communication apparatus detects network information concerning a network that communicates via a base station and performs acquisition processing for acquiring authentication information used for authentication with an authentication server via the base station from another communication apparatus according to the network information detected by the detection unit.

13 Claims, 13 Drawing Sheets

COMMUNICATION APPARATUS AND CONTROL METHOD

BACKGROUND OF THE INVENTION

1. Field of the Invention

The present invention relates to a communication apparatus and a control method.

2. Description of the Related Art

In recent years, many public places such as fast-food shops, railway stations, and airports have been offering public wireless local area network (LAN) services that provide Internet connection services by use of wireless access points. The public wireless LAN services may be free or fee-based depending on the public wireless LAN provider.

Regarding the fee-based public wireless LAN, in most cases, the use of the Internet is permitted only to the users having legitimate authentication information. Whether the user has legitimate authentication information is determined based on authentication information such as a user ID or a password. The legitimate authentication information is provided by a public wireless LAN provider or an Internet service provider (ISP) when the subscription to the service is started. Further, there is also a public wireless LAN service that allows access to a portal site in the public wireless LAN area before the user authentication. When this service is used, the authentication information can be generated on the spot at the portal WEB site.

IEEE 802.11u(TM)-2011 discusses a method by which an access point of the wireless LAN provides information regarding whether the service provided by the public wireless LAN service is free or fee-based before the connection. According to this information, it can be determined whether the public wireless LAN to be connected provides a paid or a free service. If the service is a paid service, it is determined that the authentication information is necessary.

If the authentication information of the public wireless LAN to be connected is not available, it is necessary to generate the authentication information. However, generating the authentication information is not easy for the user. Under such circumstances, US Patent Application Publication No. 2010/0066839 (Japanese Patent Application Laid-Open No. 2008-167269) discusses a technique that automatically generates the authentication information by using apparatus information of a terminal according to cooperation of the terminal and a server.

However, if the authentication information is newly generated in the public wireless LAN area where the acquisition of the authentication information is charged, information necessary for the charging will be necessary in generating the authentication information. The information necessary in the charging is, for example, credit card information. If information such as a credit card number is entered in a web form of a charge system, the charging will be executed. Further, a terminal such as a cellular phone or a smartphone can generate the authentication information without the use of the charge information such as the credit card by using a charge system of the cellular phone.

However, a terminal such as a camera which does not use the above-described charge system needs to use charge information in generating the authentication information. In order to generate fee-based authentication information by the camera alone, it is necessary to connect the camera to a web page used for generating the authentication information and enter charge information using a user interface (UI) of the camera. Entering such charge information is troublesome and annoying for the user. This problem is inherent not only to a camera.

For example, the inconvenience occurs in an apparatus such as a game machine, a printer, a toy, or a health appliance that does not have a UI suitable for inputting the charge information.

SUMMARY OF THE INVENTION

According to an aspect of the present invention, a communication apparatus detects network information concerning a network that communicates via a base station and performs processing for acquiring or providing authentication information used for authentication with an authentication server via the base station from or to another communication apparatus according to the network information detected by the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
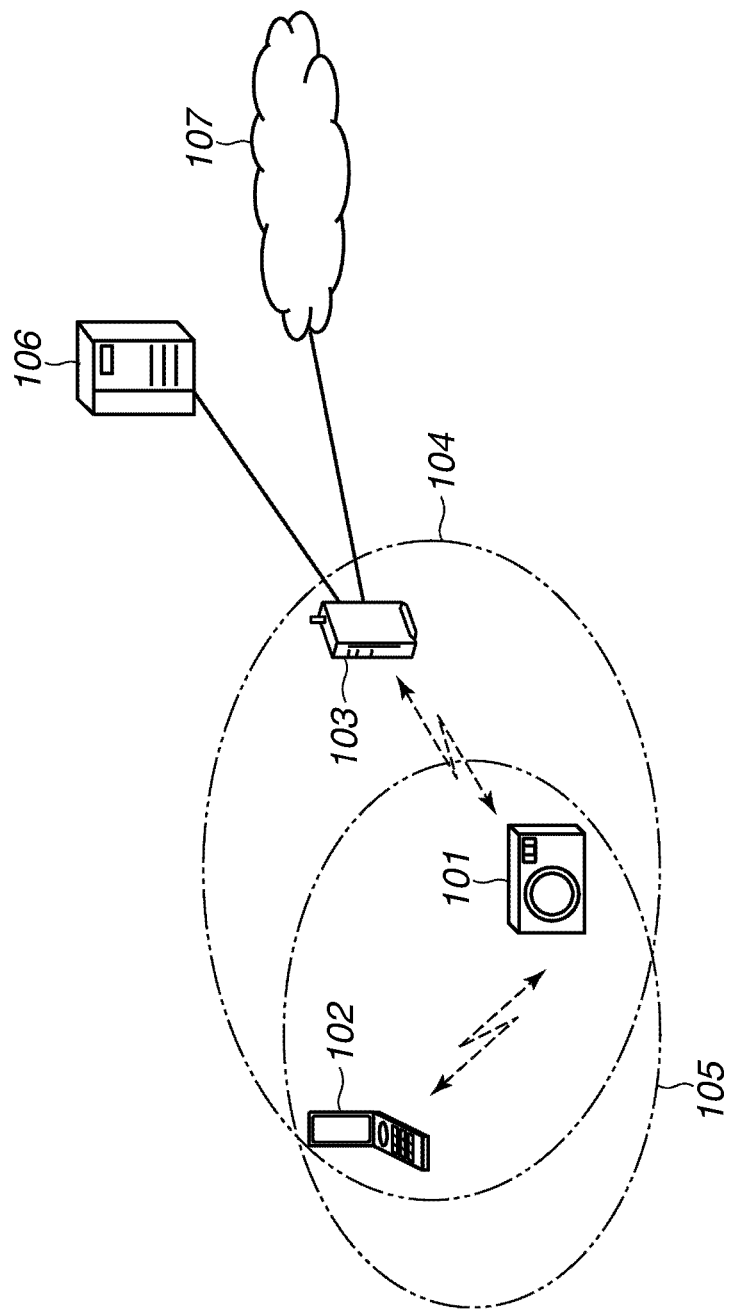
FIG. 1 illustrates a network configuration of an exemplary embodiment of the present invention.

FIG. 1 illustrates a network configuration according to a first exemplary embodiment of the present invention.

The network illustrated in FIG. 1 includes a camera 101, a cellular phone 102, a public wireless LAN access point (AP) 103, an authentication server 106, and the Internet 107. Each of the camera 101 and the cellular phone 102 is an example of a communication apparatus and performs various types of processing described below. The AP 103 operates as a base station of a first wireless LAN 104.

The first wireless LAN 104 is a wireless LAN constructed by the AP 103. Each of the camera 101 and the cellular phone 102 possesses a wireless LAN function. When the camera 101 and the cellular phone 102 are connected to the first wireless LAN 104, data communication by the wireless LAN becomes possible.

The AP 103 is connected to the authentication server 106. When a terminal connected to the AP 103 is connected to the Internet 107, the AP 103 cooperates with the authentication server 106 and controls access of the terminal by authentication processing. The authentication server 106 manages authentication information of each user or device by a database, and the authentication processing is performed using the information in the database. When the terminal passes the authentication processing by the authentication server 106, access restriction of the terminal at the AP 103 is cancelled and the connection to the Internet 107 is enabled via the AP 103.

According to the present embodiment, the authentication server 106 also serves as a server that generates and registers authentication information (e.g., user ID, password) necessary for the authentication. If a terminal that does not possess the authentication information asks for connection to the AP 103, the access to the AP 103 is controlled so that the terminal is allowed to connect only to a portal site for the generation of the authentication information.

The authentication processing is based on processing such as web-based authentication processing using Hypertext Transfer Protocol (HTTP)/Hypertext Transfer Protocol over Secure Socket Layer (HTTPS) and authentication processing executable on a wireless LAN layer of IEEE 802.1X. The authentication processing, however, is not limited to such processing.

The AP 103 provides network information of the first wireless LAN 104 in the form of a beacon or a probe response. The network information at least includes information such as whether the first wireless LAN 104 is a public wireless LAN, whether the first wireless LAN 104 is free or fee-based, and whether authentication information is used for the connection to the Internet. Further, the network information includes information such as a domain name of the provider of the public wireless LAN and realm information such as the name of the ISP.

The terminal compares the domain name or the realm information which has been received, with the authentication information which the terminal possesses, and determines whether the terminal is connectable to the public wireless LAN. In addition to the network information, the AP 103 provides a type of the authentication information. Such information includes, for example, a user ID/password, a certificate, or a subscriber identity module (SIM). Further, if the authentication information is to be newly generated, the APU 103 also provides information regarding whether the authentication information is to be generated in association with the apparatus.

If the authentication information is associated with the apparatus, the authentication information cannot be used unless registered identification information, such as a media access control (MAC) address or a unique ID, of the apparatus that desires to use the authentication information matches the authentication information. In the following description, the information concerning the above-described public wireless LAN is referred to as public wireless LAN information.

A second wireless LAN 105 is used for communication between the camera 101 and the cellular phone 102. According to the present embodiment, the second wireless LAN 105 is described as a wireless LAN. The network mode of the wireless LAN is either the infrastructure mode or the ad hoc mode. If the infrastructure mode is used, either the camera 101 or the cellular phone 102 functions as an access point of the wireless LAN. According to the present embodiment, the ad hoc mode is used as the mode of the wireless LAN.

Figure 2:
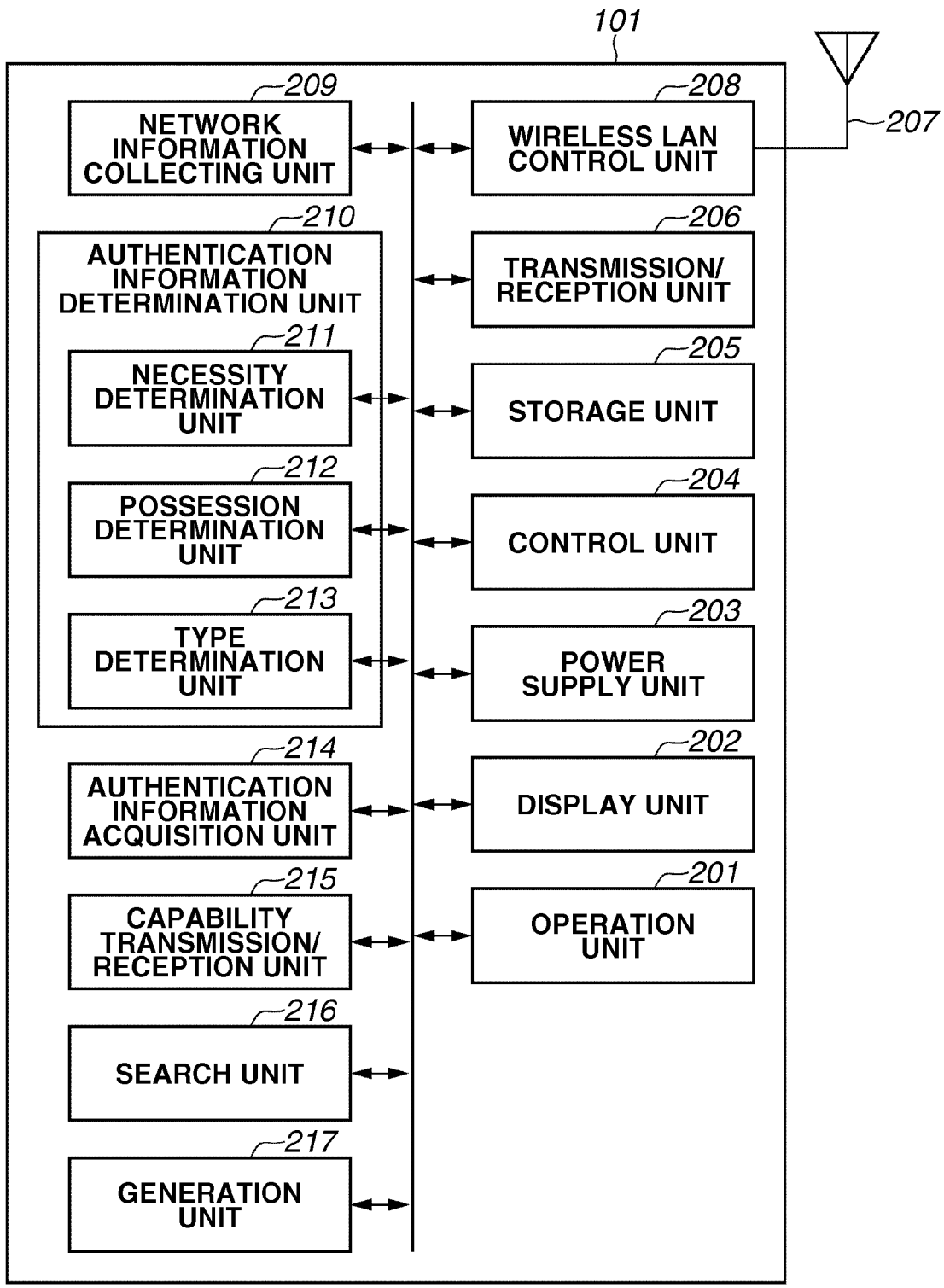
FIG. 2 is a block diagram of a configuration of a camera.

FIG. 2 is a function block diagram illustrating an example of a configuration of the camera 101. The camera 101 represents the entire camera. An operation unit 201 is used for operating the camera 101 and includes an operation button. A display unit 202 includes, for example, a liquid crystal display (LCD) or a light-emitting diode (LED) display and displays visually-recognizable information. A power supply unit 203 supplies power to the camera 101. A control unit 204 controls the entire camera 101 by executing a control program stored in a storage unit 205.

The storage unit 205 stores various types of information such as the control program executed by the control unit 204 and authentication information. Various operations described below are realized by the control unit 204 executing a control program stored in the storage unit 205. A transmission/reception unit 206 performs transmission/reception control according to a communication protocol. An antenna 207 is used when wireless LAN communication is performed.

A wireless LAN control unit 208 includes a driver that performs various control such as radio frequency (RF) control of a wireless LAN, wireless LAN communication processing, and control of the wireless LAN that conforms to the IEEE 802.11 series. A network information collecting unit 209 collects network information of a wireless network in the vicinity. The above-described public wireless LAN information is included in the network information.

An authentication information determination unit 210 performs determination processing of the authentication information. A necessity determination unit 211 determines whether authentication information is necessary in using the wireless network to be connected. The necessity determination unit 211 makes the determination based on the information collected by the network information collecting unit 209.

A possession determination unit 212 determines whether the camera 101 possesses appropriate authentication information if the wireless network to be connected requires authentication. Whether the camera possesses the appropriate authentication information is determined by using the domain name and the realm information of the public wireless LAN included in the network information.

A type determination unit 213 determines the type of the authentication information based on the information collected by the network information collecting unit 209. Whether the authentication information can be acquired free or fee-based is determined according to this determination of the type of the authentication information. Further, whether a user ID/password, a certificate, or a SIM is used for the authentication is also determined according to the type of the authentication information. Additionally, when the authentication information is newly generated, whether the authentication information is to be associated with the apparatus is also determined.

An authentication information acquisition unit 214 performs acquisition processing of authentication information in cooperation with another terminal. If the authentication information is to be newly generated, the authentication information acquisition unit 214 acquires the authentication information.

A capability transmission/reception unit 215 acquires capability information of another terminal and provides capability information of the camera 101 to the terminal. For example, if charge information is necessary in newly generating the authentication information, the capability transmission/reception unit 215 acquires information such as whether another terminal has a charge system and provides information such as whether the camera 101 has a charge system. Further, the capability transmission/reception unit 215 acquires and provides information regarding whether the charge information can be provided to the camera 101. Additionally, the capability transmission/reception unit 215 acquires information of whether another terminal possesses the authentication information of the wireless LAN to be connected and also provides information of whether the camera 101 possesses the authentication information of the wireless LAN to be connected.

A search unit 216 performs search processing of the cellular phone 102 as a terminal which can acquire the authentication information. A generation unit 217 generates and registers the authentication information with the authentication server when the camera 101 newly generates the authentication information. The authentication information can be generated according to a user operation using a browser but can also be generated by a program including an algorithm that allows automatic generation of the authentication information.

Figure 3:
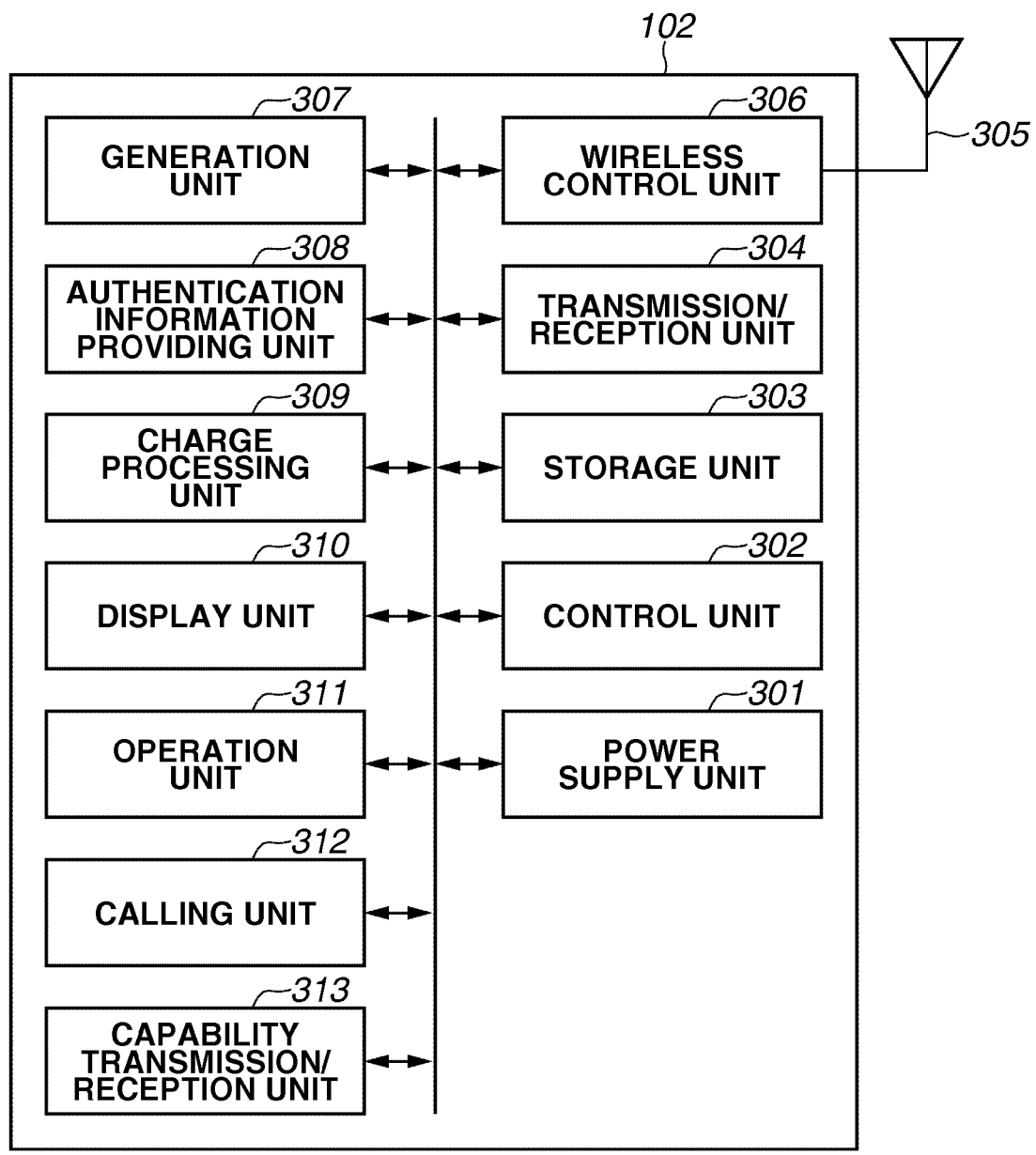
FIG. 3 is a block diagram of a cellular phone according to a first exemplary embodiment of the present invention.

FIG. 3 is an example of a function block diagram of the cellular phone 102. The cellular phone 102 represents the entire cellular phone. A power supply unit 301 supplies power to the cellular phone 102. A control unit 302 controls the entire cellular phone 102 by executing a control program stored in a storage unit 303. The storage unit 303 stores the control program executed by the control unit 302. Various operations described below are realized by the control unit 302 executing a control program stored in the storage unit 303.

A transmission/reception unit 304 controls transmission/reception of data according to a communication data protocol. An antenna 305 is used for public network communication and wireless LAN communication. The antenna 305 can be a shared antenna or can be provided for each wireless communication system. A wireless control unit 306 controls the public network communication and the wireless LAN communication. The wireless control unit 306 is, for example, a driver of various wireless communications. The wireless control unit 306 can include a public network communication unit as well as a wireless LAN communication unit. Further, the wireless control unit 306 can include one wireless unit including the functions of a part or whole of the communication units.

A generation unit 307 generates and registers authentication information with the authentication server when generation of new authentication information is necessary. The authentication information can be generated according to a user operation using a browser but can also be generated by a program including an algorithm that allows automatic generation of the authentication information. An authentication information providing unit 308 provides authentication information generated by the generation unit 307 to another apparatus.

When the authentication information is generated and if charging is necessary, a charge processing unit 309 performs charging processing using a cellular phone charge system. The charge processing unit 309 performs the charging processing in cooperation with a charge server (not shown) of a carrier (communication provider) under contract. A display unit 310 includes, for example, a liquid crystal display (LCD) or a light-emitting diode (LED) display and displays visually-recognizable information. An operation unit 311 is used for operating the cellular phone 102 and includes an operation button for inputting data into the cellular phone 102. A calling unit 312 is used when the user makes and receives a call. A capability transmission/reception unit 313 notifies another terminal of the capability of the cellular phone 102.

The function blocks in FIGS. 2 and 3 are examples and a plurality of function blocks can be included in one function block. Further, one function block can be separated into a plurality of function blocks.

The content of processing according to the present embodiment will be described with reference to FIGS. 4 to 7.

Figure 4:
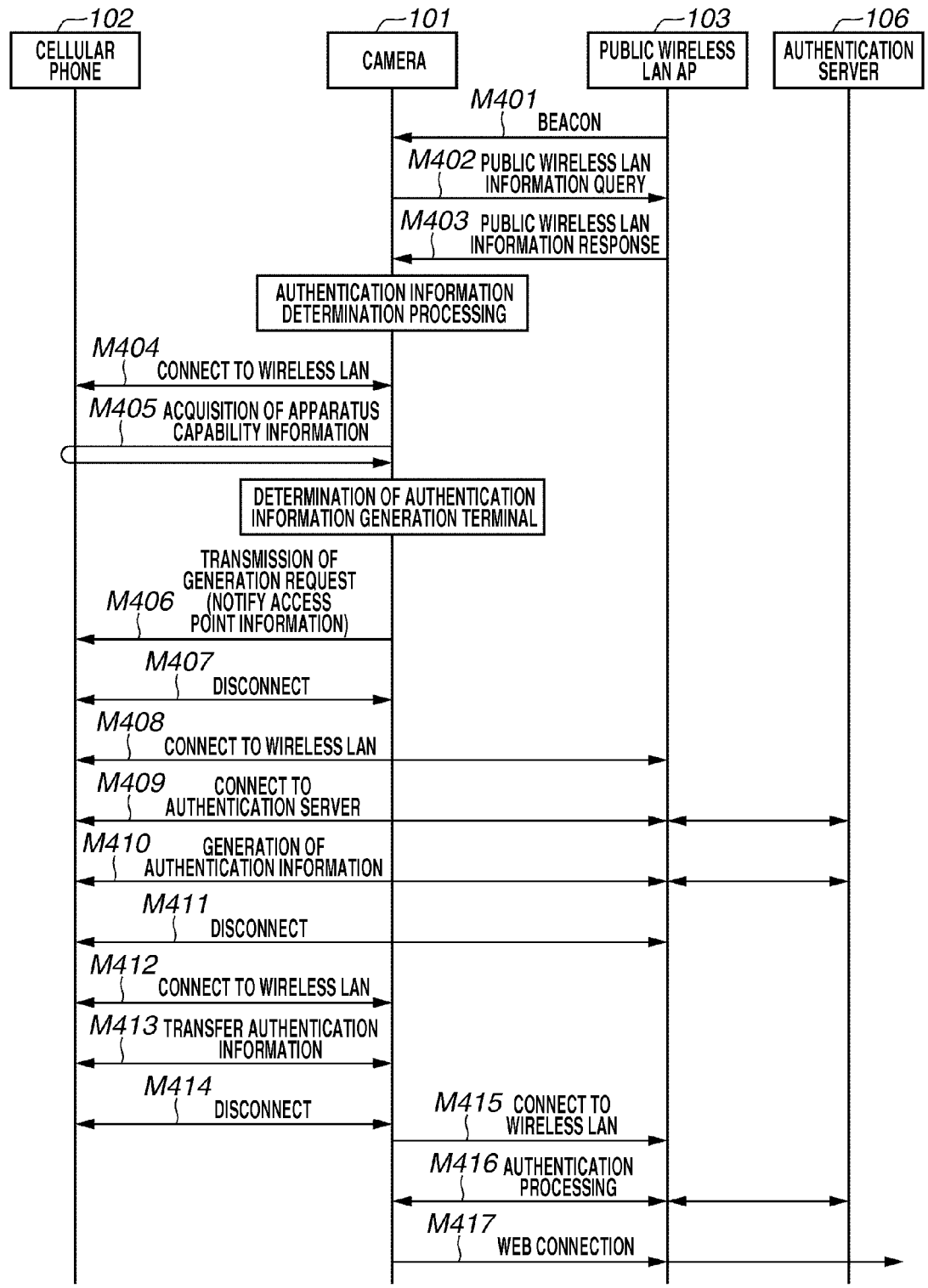
FIG. 4 is a sequence diagram according to the first exemplary embodiment.
Figure 5:
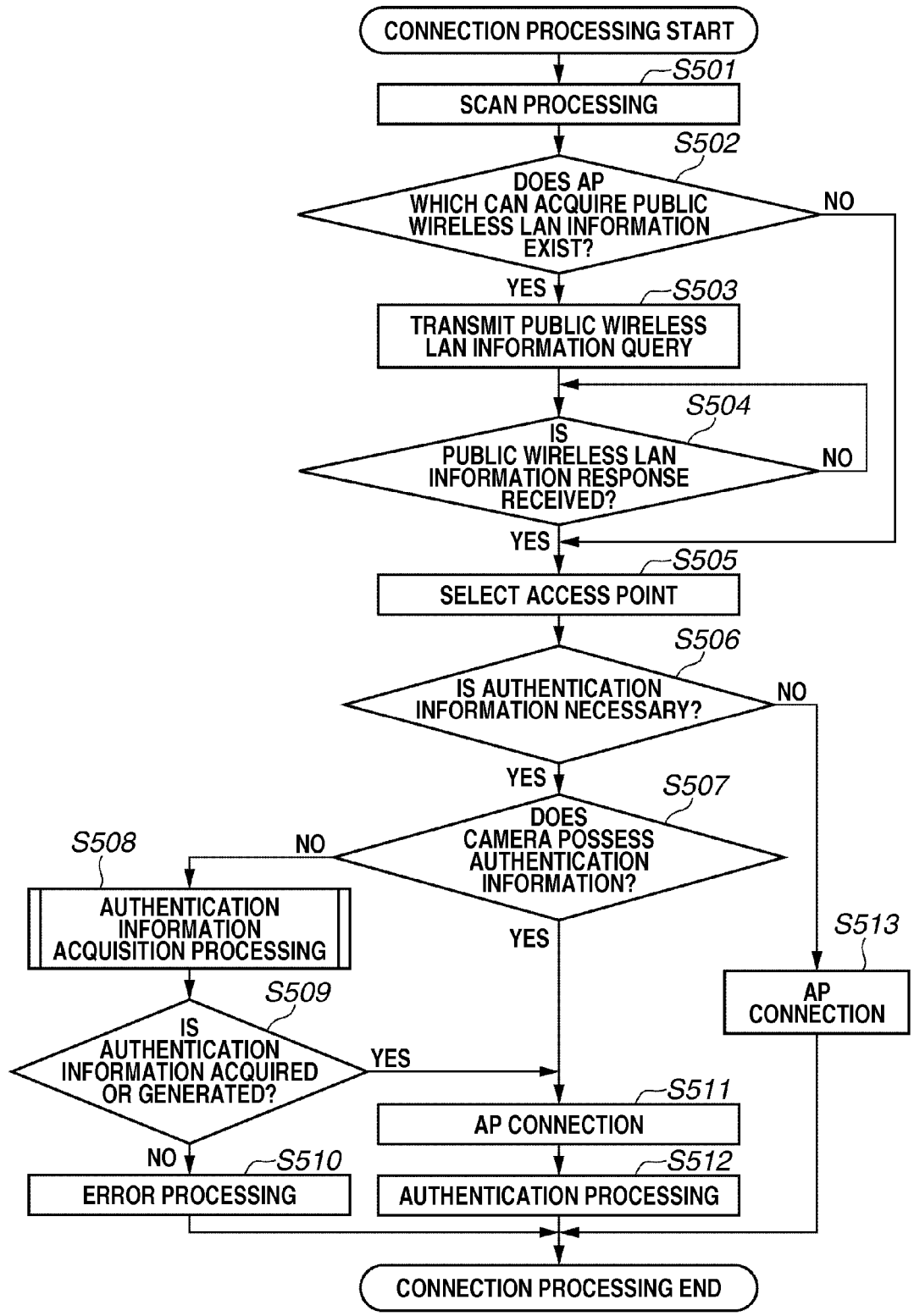
FIG. 5 is a flowchart illustrating connection processing of the camera according to the first exemplary embodiment.
Figure 6:
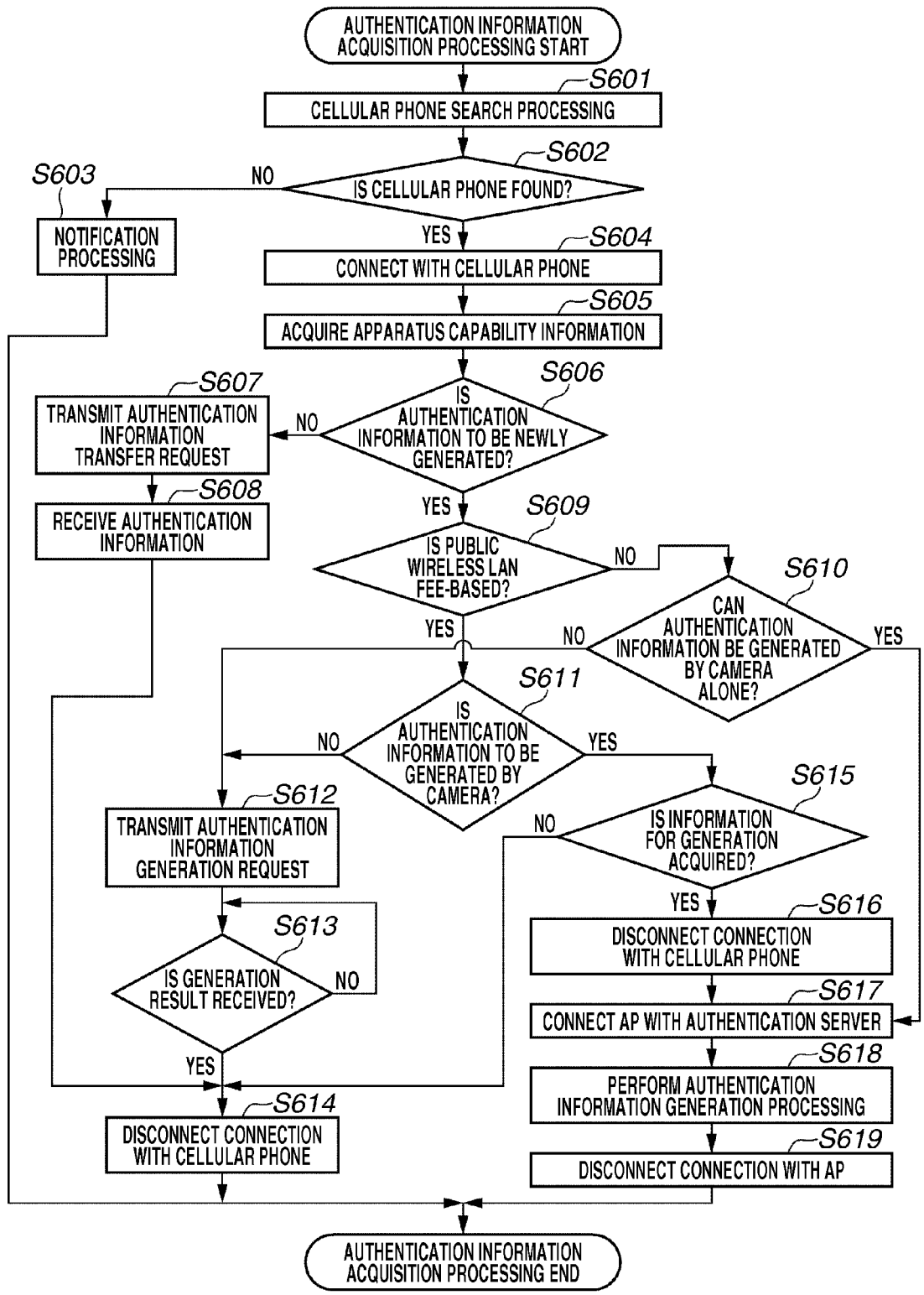
FIG. 6 is a flowchart illustrating acquisition processing of authentication information which is performed by the camera according to the first exemplary embodiment.
Figure 7:
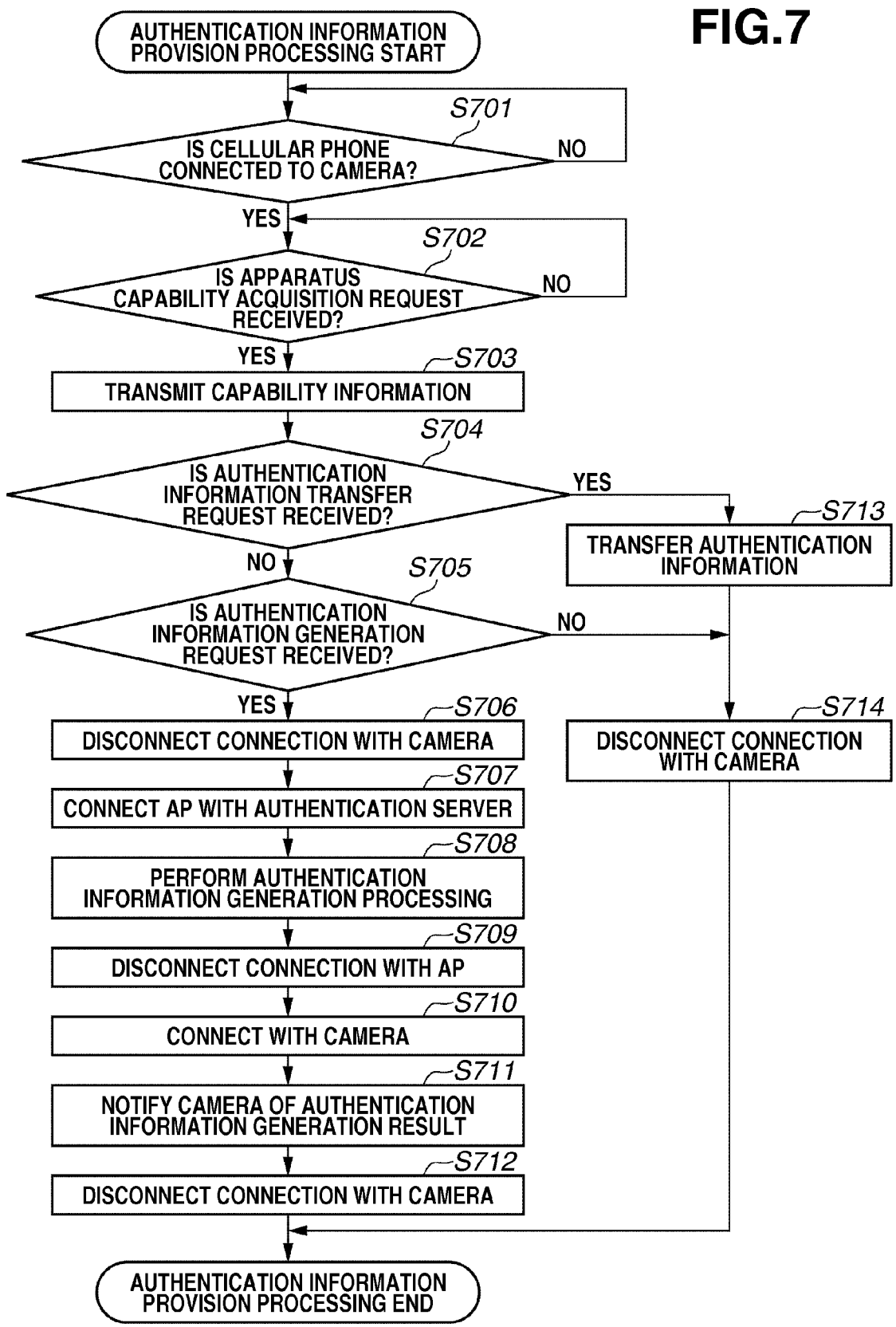
FIG. 7 is a flowchart illustrating provision processing of authentication information performed by the cellular phone according to the first exemplary embodiment.

FIG. 4 is a sequence diagram of the apparatuses. FIGS. 5 and 6 are flowcharts illustrating the connection processing and the authentication processing of the camera 101 which is performed according to the control of the control unit 204 based on a computer program stored in the storage unit 205. FIG. 7 is a flowchart illustrating the provision processing of the authentication information performed by the cellular phone 102 according to the control of the control unit 302 based on a computer program stored in the storage unit 303.

In step S501, before connecting the camera 101 to the first wireless LAN 104, the network information collecting unit 209 of the camera 101 performs the scan processing of the wireless LAN. According to this scan processing, the network information collecting unit 209 receives a beacon (M401) transmitted from the AP 103 and detects the first wireless LAN 104. Although the mode used in this scanning is passive scan that receives beacon information of the wireless LAN in the vicinity, active scan can also be used. When the active scan is used, a wireless LAN in the vicinity is detected by transmission of a probe request and reception of a probe response.

When the scan processing performed by the network information collecting unit 209 of the camera 101 ends, the processing proceeds to step S502. In step S502, the control unit 204 determines whether an AP which can provide the public wireless LAN information exists according to the collected scan information. Since an AP capable of providing the public wireless LAN information transmits a beacon or a probe response informing that it can provide such information, the control unit 204 can determine whether an AP which can provide the public wireless LAN information exists according to the beacon or the probe response. If an AP that can provide the public wireless LAN information exists (YES in step S502), the processing proceeds to step S503. If an AP that can provide the public wireless LAN information does not exist (NO in step S502), the processing proceeds to step S505. According to the present embodiment, the AP 103 can provide the public wireless LAN information.

In step S503, the network information collecting unit 209 transmits a public wireless LAN information query (M402) to the AP 103 so that it can acquire detailed information of the public wireless LAN including the authentication information.

In step S504, the control unit 204 determines whether the network information collecting unit 209 has received a public wireless LAN information response (M403). If a plurality of APs that can acquire the public wireless LAN information exists, the public wireless LAN information query is transmitted to all of such APs.

If the control unit 204 of the camera 101 detects the public wireless LAN information response (M403) sent from the AP 103 (YES in step S504), the processing proceeds to step S505. Since the public wireless LAN information response includes the public wireless LAN information, the network information collecting unit 209 can obtain the public wireless LAN information from the public wireless LAN information response.

In step S505, the control unit 204 displays the collected wireless LAN information on the display unit 202 so that the user can select the wireless LAN to be connected. For example, the control unit 204 displays a service set identifier (SSID) which is a network identifier of the collected wireless LAN. Instead of the user selecting the wireless LAN to be connected, the wireless LAN can be automatically selected by a program. For example, an AP having the strongest radio wave strength can be automatically selected. When a wireless LAN to be connected is selected via the camera 101, the processing proceeds to step S506. Before the information of the wireless LAN is displayed on the display unit, the type determination unit 213 determines the type of the authentication information to be displayed from the collected information. Then, when the wireless LAN is displayed, a wireless LAN that requires the authentication information in the SIM form is grayed out or not displayed. This is because, if the authentication information in the SIM form is necessary, only a cellular phone using a SIM card storing the authentication information can be connected. Accordingly, the camera 101 cannot be connected to the wireless LAN.

In step S506, the necessity determination unit 211 determines whether the authentication information is necessary in the connection to the selected wireless LAN. Whether the authentication information is necessary is determined based on the information regarding the authentication included in the public wireless LAN information which has been collected. If the AP to be connected is an AP of a public wireless LAN but is unable to acquire public wireless LAN information, whether the authentication is necessary can be determined according to the SSID. In this case, information regarding whether the authentication is necessary is to be stored in advance in association with the SSID. If the necessity determination unit 211 determines that the authentication information is necessary (YES in step S506), the processing proceeds to step S507. If the necessity determination unit 211 determines that the authentication information is unnecessary (NO in step S506), the processing proceeds to step S513. In step S513, the camera 101 is connected to the AP 103 by the wireless LAN and then the connection processing ends. After the camera 101 is connected to the AP 103, it can be connected to the Internet 107 via the AP 103.

In step S507, the possession determination unit 212 determines whether the camera 101 possesses the authentication information necessary in the connection to the selected public wireless LAN. This determination is performed using the realm information included in the collected public wireless LAN information. In other words, the possession determination unit 212 determines whether the camera 101 possesses the necessary authentication information depending on whether the camera 101 has the authentication information corresponding to the realm information. If the public wireless LAN information cannot be acquired from the AP to be connected, the determination can be performed based on the realm information which is associated with the SSID and stored in advance.

If the camera 101 does not possess the corresponding authentication information (NO in step S507), the processing proceeds to step S508. If the camera 101 possesses the corresponding authentication information (YES in step S507), the processing proceeds to step S511. In step S511, the camera 101 is connected to the AP 103 by the wireless LAN, and the processing proceeds to step S512. In step S512, the control unit 204 performs the authentication processing with the authentication server 106. When the authentication is successfully completed, the connection processing ends. After the camera 101 is connected to the AP 103, the camera can access the Internet 107 via the AP 103.

In step S508, the control unit 204 performs the acquisition processing of the authentication information. The acquisition processing of the authentication information will be described with reference to FIG. 6. Further, the processing performed by the cellular phone 102 will be described with reference to FIG. 7.

In step S601, the search unit 216 searches the cellular phone 102 as a terminal that can acquire the authentication information. The search unit 216 automatically searches the cellular phone 102 by using a SSID set in the camera 101 in advance. The SSID is associated with a wireless LAN and can be connected to the cellular phone 102. If a wireless LAN of the SSID exists in the vicinity, the search unit 216 determines that the cellular phone 102 is in the vicinity. The method for searching the cellular phone is not limited to such a method. A different method can be used so long as the existence of the cellular phone 102 can be detected by the camera 101.

In step S602, the control unit 204 determines whether the cellular phone is found. If the cellular phone is not found in this search (NO in step S602), the processing proceeds to step S603. In step S603, the notification processing is performed. According to this notification processing, for example, a message such as "Connect camera to cellular phone by wireless LAN and acquire authentication information of public wireless LAN" is displayed. In such a case, according to the present embodiment, after step S603, although the acquisition processing of the authentication information is finished, depending on the connection operation of the user regarding the cellular phone, the processing may return to step S601, and the cellular phone search processing can be performed again. Further, in step S603, the camera 101 can display a message notifying the user that the authentication information can be generated by entering charge information such as credit card information and ask the user to determine whether to generate the information.

Further, a message indicating that the camera is connected to a cellular phone by a wireless LAN or a message asking the user to acquire authentication information of the public wireless LAN using a cellular phone may be displayed before the search processing in step S601. If such a message is displayed and the user designates the connection with the cellular phone, the search processing of the cellular phone 102 is performed in step S601.

In step S602, if the cellular phone 102 is found (YES in step S602), the processing proceeds to step S604. In step S604, the camera 101 is connected to the cellular phone 102 by the wireless LAN under control of the wireless LAN control unit 208. According to the present embodiment, a parameter necessary in the connection to the wireless LAN is stored in advance in the camera 101 as well as the cellular phone 102. As a detection method of the second wireless LAN 105, either the camera 101 or the cellular phone 102 can establish the second wireless LAN 105 at regular intervals. In such a case, the apparatus that did not establish the second wireless LAN 105 can detect the second wireless LAN 105. Further, a UI of either the camera 101 or the cellular phone 102 may notify the user to connect to the other apparatus by the second wireless LAN 105. In such a case, based on the user operation, the second wireless LAN 105 is detected and the apparatuses are mutually connected by the wireless LAN.

Further, in step S604, the camera 101 and the cellular phone 102 can execute a parameter setting method called Wi-Fi Protected Setup (WPS). When such a method is executed, the camera 101 and the cellular phone 102 can be connected using a shared wireless parameter.

After the camera 101 is connected to the cellular phone 102, the processing proceeds to step S605. In step S605, the capability transmission/reception unit 215 transmits the public wireless LAN information of the public wireless LAN which has been selected in step S505 to the cellular phone 102. Further, the capability transmission/reception unit 215 transmits a request for apparatus capability information to the cellular phone 102 and receives the apparatus capability information of the cellular phone 102 (M405).

On the side of the cellular phone 102, in step S701, the control unit 302 determines whether the cellular phone 102 is connected to the camera 101 by the wireless LAN under control of the wireless LAN control unit 306. If the cellular phone 102 is connected to the camera 101 (YES in step S701), the processing proceeds to step S702. If the cellular phone 102 is not yet connected to the camera 101 (NO in step S701), step S701 is repeated. In step S702, the control unit 302 determines whether the capability transmission/reception unit 313 has received the request for apparatus capability acquisition from the camera 101. If the request is received (YES in step S702), the processing proceeds to step S703. If the request is not yet received (NO in step S702), step S702 is repeated. In step S703, the apparatus capability information of the cellular phone 102 is transmitted to the camera 101. Before the apparatus capability acquisition information is transmitted to the camera, authentication of whether the camera 101 is a correct terminal can be performed.

The apparatus capability information includes information such as whether the cellular phone 102 possesses the authentication information of the public wireless LAN to be connected, whether the charge system of the cellular phone 102 can be used, and whether the cellular phone 102 can provide the charge information to another terminal. Whether the charge system of the cellular phone can be used is determined by the cellular phone 102 and the result is notified to the camera 101. The cellular phone 102 makes the determination based on whether the charges can be implemented in the charges of the charge system when a fee is charged.

Whether the cellular phone 102 can provide the charge information to another apparatus is included in credit card information stored in the cellular phone 102. If the credit card information can be provided to another apparatus, the cellular phone 102 determines that the charge information can be provided to another apparatus. Further, whether the charge information can be provided to another apparatus can be determined based on whether the information necessary in the charging of the charge system can be provided to another apparatus when the charging is performed. The information necessary in the charging of the charge system is, for example, SIM information. However, such information is not limited to the SIM information.

Referring back again to FIG. 6, after acquiring the apparatus capability information, the camera 101 performs determination processing based on the apparatus capability information of the cellular phone 102.

In step S606, the authentication information determination unit 210 determines whether it is necessary to newly generate the authentication information based on the determination by the possession determination unit 212. If the cellular phone 102 possesses the authentication information corresponding to the realm information of the public wireless LAN to be connected (NO in step S606), the processing proceeds to step S607. In step S607, in order to obtain the authentication information from the cellular phone 102, the authentication information acquisition unit 214 sends a transfer request for the authentication information to the cellular phone 102.

Referring back again to FIG. 7, in step S704, the control unit 302 determines whether the authentication information providing unit 308 of the cellular phone 102 has received the transfer request for the authentication information. If the request is received (YES in step S704), the processing proceeds to step S713. If the request is not yet received (NO in step S704), the processing proceeds to step S705. In step S713, the authentication information providing unit 308 transfers the authentication information which corresponds to the realm information of the public wireless LAN to which the camera 101 is to be connected out of the authentication information which the cellular phone 102 possesses. If a plurality piece of corresponding information exists, all of such information can be transmitted to the camera 101 or the authentication information appropriate for the camera 101 can be selected from such information and transferred to the camera 101. After the authentication information is transferred to the camera 101, the processing proceeds to step S714. In step S714, the wireless LAN connection with the camera 101 is disconnected.

Referring back again to FIG. 6, in step S608, the camera 101 receives the authentication information. In step S614, the wireless LAN connection with the cellular phone 102 is disconnected.

In step S606, if the cellular phone 102 does not possess the authentication information corresponding to the realm information of the public wireless LAN to be connected, the authentication information determination unit 210 determines that the authentication information is to be newly generated (YES in step S606), and the processing proceeds to step S609. In step S609, a type determination unit 213 determines whether the public wireless LAN to be connected is fee-based based on the acquired public wireless LAN information. If the public wireless LAN to be connected is fee-based, it is determined that charge information is necessary when the authentication information is generated. If the public wireless LAN to be connected is free (NO in step S609), the processing proceeds to step S610.

In step S610, the authentication information determination unit 210 determines whether the authentication information can be generated by the camera 101 alone.

If the public wireless LAN to be connected is free and the generation of the authentication information is necessary, since the charge information is not necessary, the authentication information may be generated by the camera 101 alone. This is a case where, for example, only the generation processing of the authentication information is necessary. For example, if the camera possesses an automated generation algorithm of the authentication information or a browser function, the authentication information can be generated by the camera alone. Thus, in such a case, it is determined that the authentication information can be generated by the camera 101 alone.

After the authentication information is generated, in some cases, the user is asked to register the authentication information via a designated registration page. A uniform resource locator (URL) of the registration page is sent from the server by an e-mail. In this case, if the camera 101 does not possess the mail function, since the authentication information cannot be generated by the camera alone, it is determined that the generation of the authentication information is not possible by the camera 101 alone.

As a method for the determination by the camera 101, for example, if a function necessary in the generation of the authentication information is provided by the AP 103 as extended information of the public wireless LAN information, for example, the camera 101 can make the determination by receiving the extended information and comparing it with the function which the camera 101 possesses. The functions necessary in the generation of the authentication information are, for example, a mail function and a browser function.

If it is determined that the authentication information can be generated by the camera alone (YES in step S610), the processing proceeds to step S617. If it is determined that the authentication information cannot be generated by the camera alone or if it is not possible to determine whether the authentication information can be generated (NO in step S610), the processing proceeds to step S612. However, if it is determined that the public wireless LAN to be connected is free in step S609, it may be determined in step S610 that the authentication information is to be unconditionally generated by the camera 101.

In step S609, if the public wireless LAN to be connected is fee-based (YES in step S609), the processing proceeds to step S611. In step S611, the authentication information determination unit 210 determines whether the authentication information is to be generated by the camera 101.

According to the present embodiment, whether the authentication information is to be generated by the camera 101 is determined based on the information of whether the authentication information is to be generated in association with the apparatus. Such information is included in the public wireless LAN information. However, if it is determined that the public wireless LAN to be connected is charged in step S609, it can be determined in step S611 that the charge information is necessary in the generation of the authentication information. In such a case, it may be determined that the authentication information is to be unconditionally generated by the cellular phone 102.

In step S611, if the authentication information is to be generated in association with the apparatus information, it is determined that the authentication information is to be generated by the camera 101 (YES in step S611), and the processing proceeds to step S615. If the authentication information does not need to be generated in association with the apparatus information, since the generation of the authentication information by the camera 101 is unnecessary (NO in step S611), the processing proceeds to step S612.

In step S612, since the authentication information is to be generated by the cellular phone 102, the authentication information acquisition unit 214 transmits the authentication information generation request (M406) to the cellular phone 102. Together with the generation request, information such as SSID and Basic Service Set Identifier (BSSID) of the AP 103 which has been selected by the user of the camera 101, the public wireless LAN information, and information of the authentication server 106 such as the URL is transferred to the cellular phone 102. Accordingly, the cellular phone 102 does not need to select the public wireless LAN to be connected.

Referring back again to FIG. 7, in step S705, the control unit 302 determines whether the authentication information generation request has been received by the cellular phone 102. If the request is received (YES in step S705), the processing proceeds to step S706.

If the cellular phone 102 does not receive the authentication information generation request within a predetermined period of time or receives a message indicating that the generation of the authentication information is unnecessary (NO in step S705), the processing proceeds to step S714. In step S714, the control unit 302 disconnects the wireless LAN connection with the camera 101. Then, the provision processing of the authentication information ends.

In step S706, the control unit 302 disconnects the wireless LAN connection with the camera 101, and the processing proceeds to step S707. In step S707, according to the control of the wireless control unit 306, the cellular phone 102 is connected to the AP 103 by the wireless LAN using the information of the AP 103 to be connected obtained from the camera 101 and the public wireless LAN connection information. Then, the cellular phone 102 communicates with the authentication server 106 connected to the AP 103 via the AP 103.

In step S708, the generation unit 307 generates the authentication information. The authentication information can be generated by a program including an algorithm that allows automatic generation of the authentication information but can be manually generated by the user. If registration using the mail function is necessary in generating the authentication information, the cellular phone 102 receives the mail and the registration processing of the authentication information is performed.

When the generation of the authentication information ends, the processing proceeds to step S709. In step S709, the wireless LAN connection with the AP 103 is disconnected. In step S710, the cellular phone 102 is connected again to the camera 101 by the wireless LAN. In step S711, the authentication information providing unit 308 provides a message (M413) including the generation result of the authentication information to the camera 101. If the generation of the authentication information is successful, the authentication information is transmitted to the camera 101 together with the message. Then, the processing proceeds to step S712.

In step S613, the control unit 204 determines whether the generation result is received by the authentication information acquisition unit 214 of the camera 101. If the generation result is received (YES in step S613), the processing proceeds to step S614. Further, if the generation is successful, the control unit 204 sets the authentication information, which has been sent together with the result, to the camera 101.

In step S712, the control unit 302 of the cellular phone 102 disconnects the wireless LAN connection with the camera 101, and the provision processing of the authentication information ends. Similarly, in step S614, the camera 101 disconnects the wireless LAN connection with the cellular phone 102.

In step S615, the authentication information determination unit 210 determines whether the information necessary in the generation of the authentication information by the camera 101 can be obtained from the cellular phone 102.

The information necessary in the generation of the authentication information is, for example, charge information. If charge information of, for example, a credit card is stored in the cellular phone 102, the authentication information determination unit 210 determines whether the information of the credit card can be obtained. Further, if a charge system is used, it is determined whether charge information (e.g., SIM information) necessary in the charge system can be obtained from the cellular phone 102. If the information necessary for the generation of the authentication information cannot be obtained from the cellular phone 102 (NO in step S615), the processing proceeds to step S614. In step S614, the control unit 204 disconnects the wireless LAN connection with the cellular phone 102. Then, the authentication information acquisition processing ends.

In step S615, if the information necessary for the generation of the authentication information can be obtained (YES in step S615), the authentication information acquisition unit 214 obtains the information necessary for the generation of the authentication information from the cellular phone 102, and the processing proceeds to step S616.

In step S616, the control unit 204 disconnects the wireless LAN connection with the cellular phone 102. In step S617, the control unit 204 connects the camera 101 again to the AP 103 by the wireless LAN. Then, the camera 101 is connected to the authentication server 106 via the AP 103. In step S618, the generation unit 217 generates the authentication information using the information acquired from the cellular phone 102. The authentication information can be automatically generated by using an algorithm or generated manually by an operation of the user of the camera 101. After the generation processing is completed, the processing proceeds to step S619. In step S619, the wireless LAN connection with the AP 103 is disconnected. Then, the authentication information acquisition processing ends.

Referring back again to the flowchart in FIG. 5, when the authentication information acquisition processing of the camera 101 ends, the processing proceeds to step S509. In step S509, the control unit 204 determines whether the camera 101 has acquired or generated the authentication information. If the camera 101 has not acquired or generated the authentication information (NO in step S509), the processing proceeds to step S510. In step S510, the control unit 204 performs error processing. As the error processing, for example, the display unit 202 of the camera 101 displays a message notifying the user of an error. The error processing, however, is not limited to such notification and, for example, if the public wireless LAN to be connected is fee-based, the user may be asked to input the charge information using the camera 101. Then, the authentication information generation processing can be performed.

In step S509, if the authentication information is acquired or newly generated (YES in step S509), the processing proceeds to step S511. In step S511, the camera 101 is connected to the AP 103 by the wireless LAN. In step S512, by using the authentication information, the control unit 204 performs the authentication processing with the authentication server 106 via the AP 103. If the authentication with the authentication server 106 is successful, the camera 101 can be connected to the Internet 107 via the AP 103.

According to the present embodiment, even if the camera 101 does not possess the authentication information necessary for the connection of the camera 101 to the public wireless LAN, the authentication information can be simply acquired by cooperating with the cellular phone 102. Especially, if the generation of the authentication information is not free, since the user of the camera 101 does not need to input the charge information in generating the authentication information, the load of the user is reduced.

Further, according to the present embodiment, when the SSID of the connectable public wireless LAN is displayed on the display of the camera 101 and the user selects the public wireless LAN to be connected in step S505, if it is determined that a cellular phone does not exist in the vicinity, the SSID of the public wireless LAN whose authentication information is not possessed may not be displayed or gray-out.

Whether a cellular phone exists in the vicinity is determined using, for example, a SSID of the second wireless LAN 105 of the camera 101 and the cellular phone 102. More precisely, the SSID of the second wireless LAN 105 is stored in advance in the camera 101 and when the scan processing is performed in step S501, whether the SSID of the second wireless LAN 105 is found is determined.

Further, if the terminal in the vicinity provides information of its device type by a frame of the wireless LAN, whether a cellular phone exists in the vicinity can be determined by using the device type. Furthermore, whether a cellular phone exists in the vicinity can be determined by obtaining history information regarding the connection with the cellular phone over the wireless LAN. In this case, if the time that passed from the latest disconnection is within a defined period of time, it is assumed that a cellular phone exists in the vicinity.

According to the description above, authentication information used for the authentication with the authentication server can be acquired from another communication apparatus. Even if the user interface of the apparatus is not appropriate for the input operation, network authentication using the authentication information can be performed.

According to the first exemplary embodiment, the connection processing is started by the camera 101. According to a second exemplary embodiment of the present invention, the connection processing is started by the cellular phone 102.

Since the network configuration according to the present embodiment is similar to the one illustrated in FIG. 1, the configuration is not described.

Figure 8:
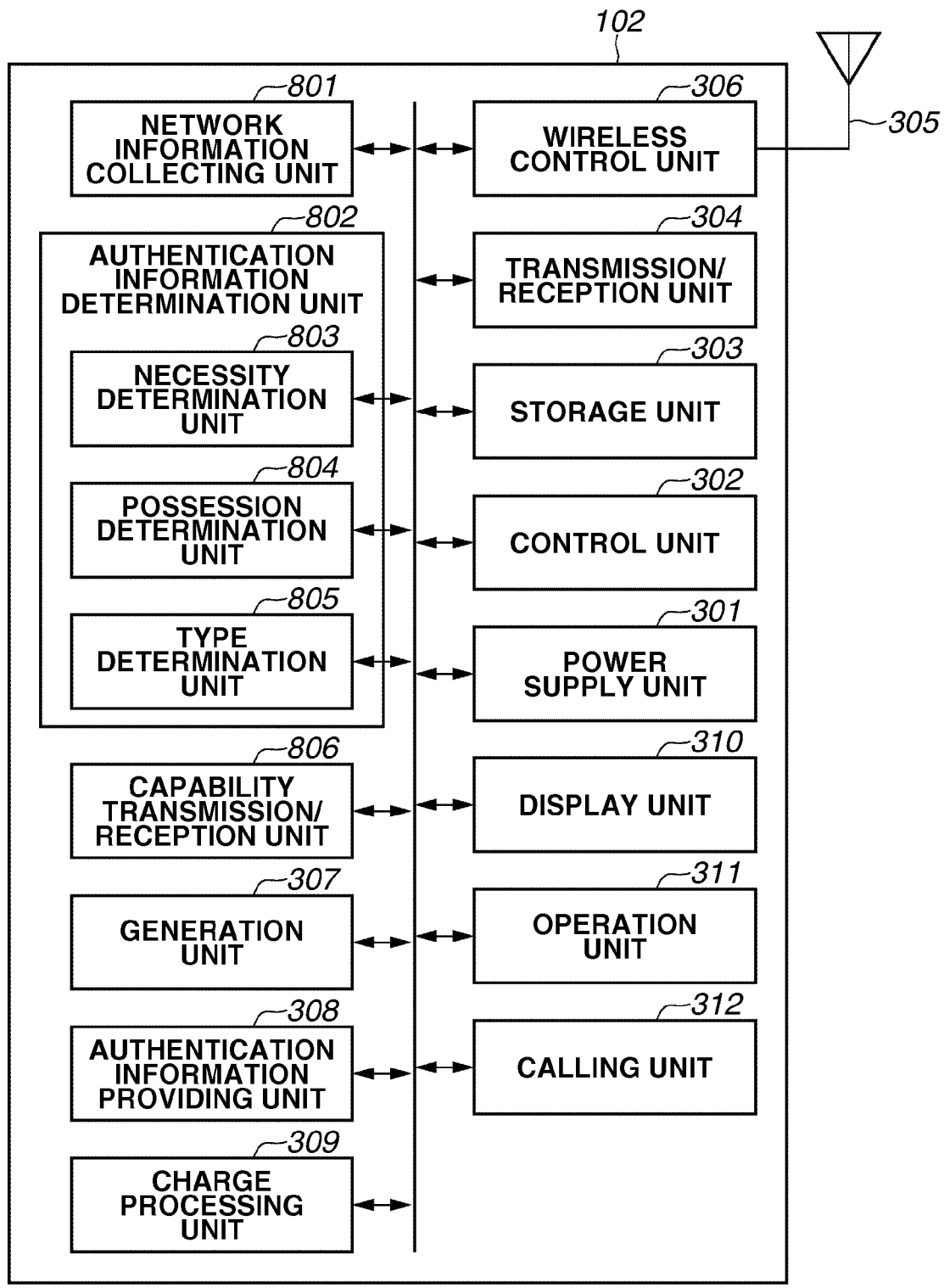
FIG. 8 is a block diagram of the cellular phone according to a second exemplary embodiment of the present invention.

FIG. 8 is a block diagram of the cellular phone 102 according to the present embodiment. Since the function blocks 301 to 312 are similar to those illustrated in FIG. 3, their descriptions are not repeated. The function blocks 801 to 805 are similar to the function blocks 209 to 213 of the camera 101 illustrated in FIG. 2. Further, a capability transmission/reception unit 806 is a function block similar to the capability transmission/reception unit 215 of the camera 101 in FIG. 2.

Further, since the function blocks of the camera 101 are similar to those illustrated in FIG. 2, or similar to the function blocks in FIG. 2 but excluding the function blocks 210 to 213 and 215, their descriptions are not repeated. The above-described function blocks are examples and a plurality of function blocks can be included in one function block. Further, one function block can be separated into a plurality of function blocks.

Figure 9:
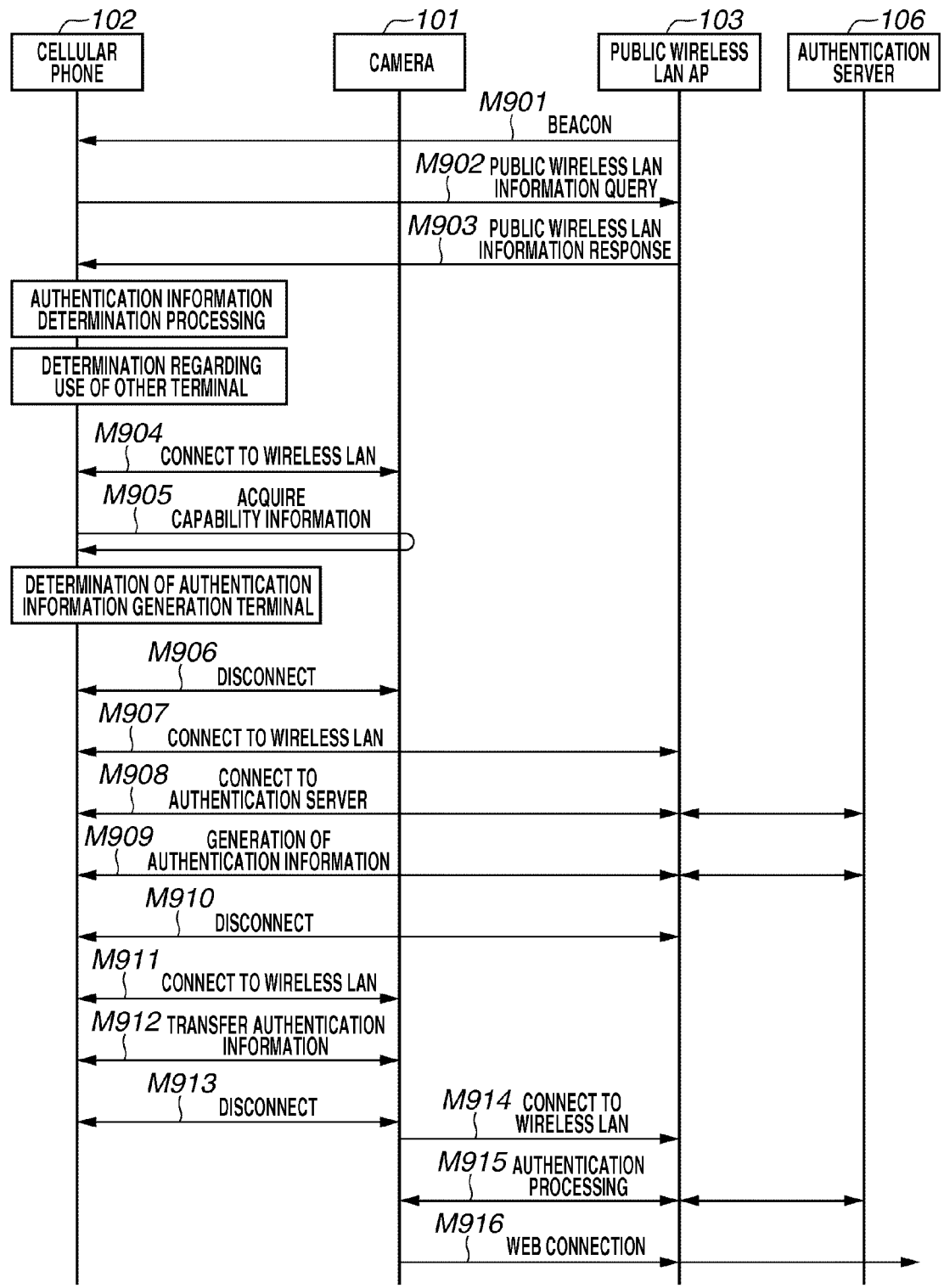
FIG. 9 is a sequence diagram according to the second exemplary embodiment.

FIG. 9 is a sequence diagram of the apparatuses.

Figure 10:
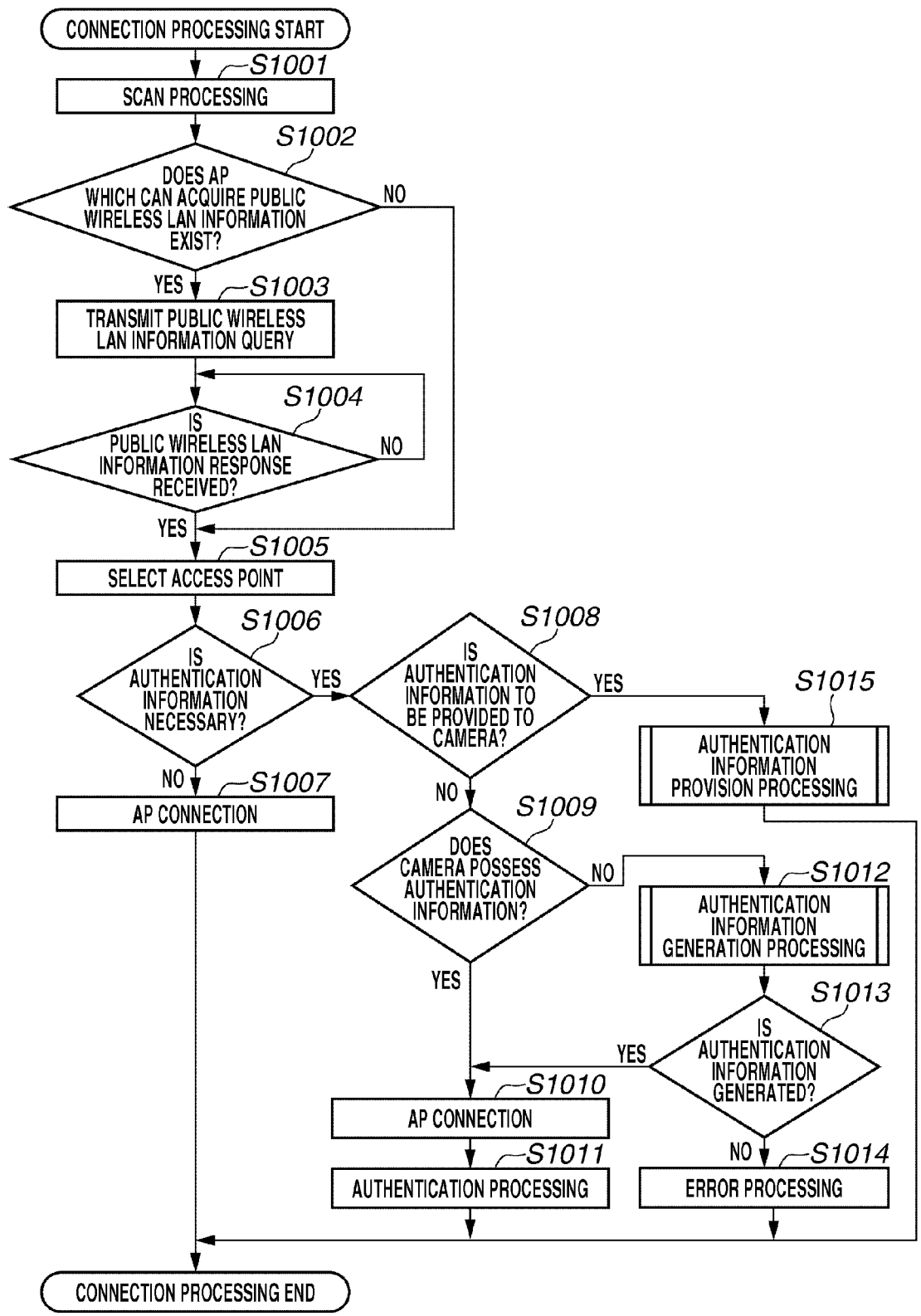
FIG. 10 is a flowchart illustrating connection processing performed by the cellular phone according to the second exemplary embodiment.
Figure 11:
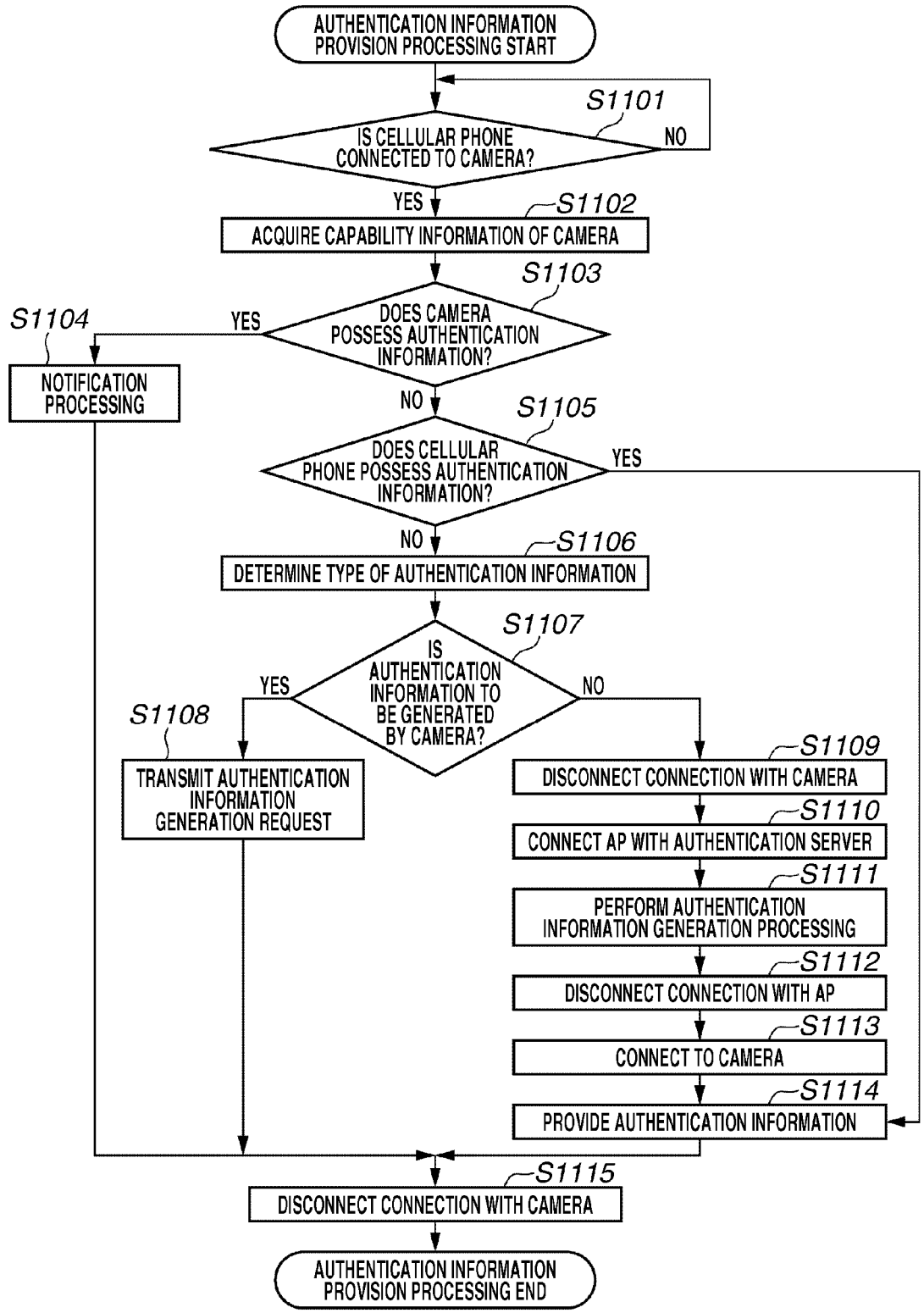
FIG. 11 is a flowchart illustrating provision processing of authentication information performed by the cellular phone according to the second exemplary embodiment.

FIGS. 10 and 11 are flowcharts illustrating the connection processing of the cellular phone 102 which is performed under control of the control unit 302 based on a computer program stored in the storage unit 303 according to the present embodiment.

Figure 12:
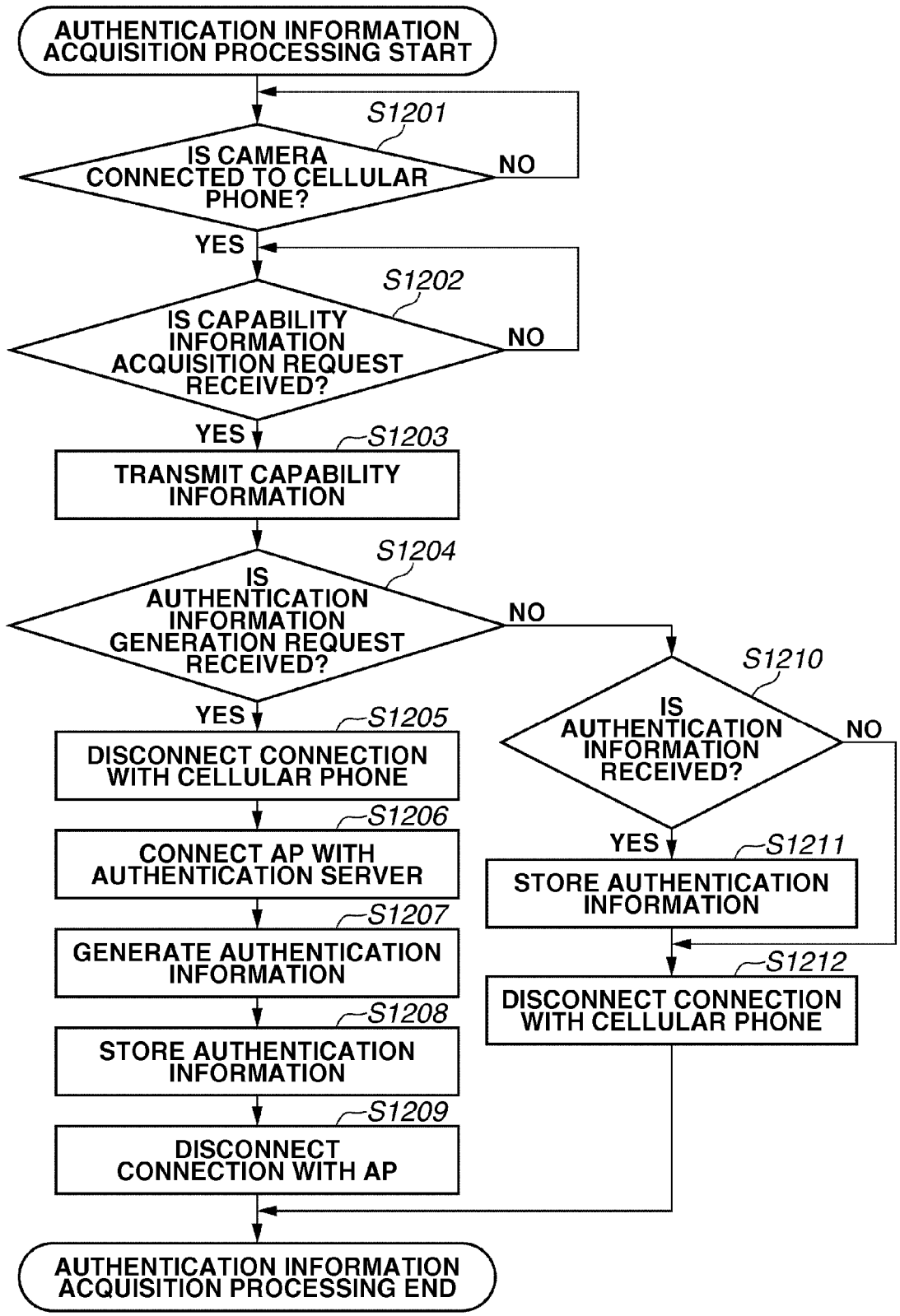
FIG. 12 is a flowchart illustrating acquisition processing of authentication information performed by the camera according to the second exemplary embodiment.

FIG. 12 is a flowchart illustrating the authentication information acquisition processing of the camera 101 which is performed under control of the control unit 204 based on a computer program stored in the storage unit 205 according to the present embodiment.

In step S1001, before connecting the cellular phone 102 to the first wireless LAN 104, a network information collecting unit 801 of the cellular phone 102 performs the scan processing of the wireless LAN. Since steps S1001 to S1006 are similar to steps S501 to S506 of the camera 101 according to the first exemplary embodiment, their descriptions are not repeated. According to the present embodiment, the cellular phone 102 is connected to the AP 103.

In step S1006, if the control unit 302 determines that the authentication information is necessary in connecting the cellular phone 102 to the wireless LAN (YES in step S1006), the processing proceeds to step S1008. If the control unit 302 determines that the authentication information is unnecessary (NO in step S1006), the processing proceeds to step S1007. In step S1007, the cellular phone 102 is connected to the AP 103, and then the connection processing ends.

In step S1008, the authentication information providing unit 308 determines whether the authentication information can be provided to another apparatus. According to the present embodiment, a message asking the user to determine whether the authentication information used in the connection can be provided to another apparatus is displayed on the display unit of the cellular phone 102 and the user makes the determination. If a device that provides the authentication information is integrated in the cellular phone 102 in advance, it can be determined that the authentication information is provided to the device.

In step S1008, if the authentication information providing unit 308 determines that the authentication information is not provided to another apparatus (NO in step S1008), the processing proceeds to step S1009. If it is determined that the authentication information can be provided to another apparatus (YES in step S1008), the processing proceeds to step S1015.

In step S1009, a possession determination unit 804 determines whether the cellular phone 102 possesses the authentication information of the public wireless LAN to be connected. If the cellular phone 102 possesses the authentication information (YES in step S1009), the processing proceeds to step S1010. If the cellular phone 102 does not possess the authentication information (NO in step S1009), the processing proceeds to step S1012. In step S1012, the generation unit 307 performs the authentication information generation processing. The generation processing of the authentication information performed by the cellular phone 102 alone uses a browser or an automated generation algorithm.

In step S1013, the control unit 302 determines whether the authentication information has been successfully generated according to the generation processing of the authentication information. If the authentication information is generated (YES in step S1013), the processing proceeds to step S1010. If the authentication information is not generated (NO in step S1013), the processing proceeds to step S1014. In step S1010, the cellular phone 102 is connected to the AP 103 by the wireless LAN using the authentication information which the cellular phone 102 possesses or the authentication information which has been generated. In step S1011, the authentication processing is performed and the connection processing is performed. In step S1014, the error processing such as the error notification is performed. Then, the connection processing ends.

In step S1015, the provision processing of the authentication information is performed. The provision processing performed by the cellular phone 102 is described with reference to FIG. 11. Further, the provision processing performed by the camera 101 is described with reference to FIG. 12.

In step S1101, the control unit 302 determines whether the cellular phone 102 is connected to another apparatus (the camera 101 according to the present embodiment) by the wireless LAN. Similarly, in step S1201, the control unit 204 determines whether the camera 101 is connected to the cellular phone 102 by the wireless LAN. Since the wireless LAN connection processing of the camera 101 and the cellular phone 102 according to the present embodiment is realized by processing similar to the connection processing according to the first exemplary embodiment, detailed descriptions of such processing are not repeated.

In step S1102, after the connection with the camera 101 by the second wireless LAN 105, the cellular phone 102 obtains the capability information of the camera 101 via the capability transmission/reception unit 806. More precisely, the capability transmission/reception unit 806 of the cellular phone 102 transmits a request for the capability information to the camera 101. In step S1202, the control unit 204 determines whether the camera 101 has received the request for the capability information (M905). If the control unit 204 determines that the camera 101 has received the request (YES in step S1202), the processing proceeds to step S1203. In step S1203, the capability transmission/reception unit 215 transmits the capability information to the cellular phone 102.

The capability information includes realm information of the authentication information which the camera 101 possesses as well as the function information which the camera 101 possesses. The function information includes information of the mail function and the browser function.

In step S1103, the possession determination unit 804 of the cellular phone 102 determines whether the camera 101 possesses the authentication information of the public wireless LAN to be connected. In other words, the possession determination unit 804 compares the realm information of the authentication information which the camera 101 possesses and the collected public wireless LAN information and determines whether the camera 101 possesses the authentication information of the public wireless LAN to be connected. If the camera 101 possesses the authentication information (YES in step S1103), the processing proceeds to step S1104. In step S1104, the notification processing is performed. As the notification processing, for example, a message such as "the camera 101 already possesses authentication information" is displayed on the display unit. After the notification processing, the processing proceeds to step S1115.

If the camera 101 does not possess the authentication information (NO in step S1103), the processing proceeds to step S1105. In step S1105, the possession determination unit 804 of the cellular phone 102 determines whether the cellular phone 102 possesses the authentication information of the public wireless LAN to be connected. If the cellular phone 102 possesses the authentication information (YES in step S1105), the processing proceeds to step S1114. If the cellular phone 102 does not possess the authentication information (NO in step S1105), the processing proceeds to step S1106.

In step S1106, the type determination unit 805 of the cellular phone 102 performs the type determination processing of the authentication information of the public wireless LAN to be connected. According to the type determination processing of the authentication information, it is determined whether the authentication information to be generated is to be associated with the apparatus. In other words, it is determined whether the authentication information to be generated is to be associated with the apparatus based on the collected public wireless LAN information. If the authentication information is to be associated with the apparatus, the authentication information is to be generated by the camera 101. Further, before the authentication information is generated, information necessary in the generation (e.g., charge information) is extracted from the public wireless LAN information and whether the extracted information can be provided to the camera 101 is determined. If the information necessary in the generation can be provided to the camera 101, it is determined that the authentication information will be generated by the camera 101. If the information necessary in the generation cannot be provided to the camera 101, a message indicating that the authentication information cannot be provided to the camera 101 can be displayed, at that time, on the display unit of the camera.

If the authentication information is not associated with the apparatus, it is determined that the authentication information will be generated by the cellular phone 102.

In step S1107, the control unit 302 determines whether the authentication information is to be generated by the camera 101 according to the determination result of the type of the authentication information. If the authentication information is to be generated by the camera 101 (YES in step S1107), the processing proceeds to step S1108. If the authentication information is to be generated by the cellular phone 102 (NO in step S1107), the processing proceeds to step S1109.

In step S1108, the authentication information providing unit 308 transmits an authentication information generation request to the camera 101 to the effect that the authentication information is to be generated by the camera 101. In addition to the information necessary in the generation of authentication information, the request includes information (SSID, BSSID) of the AP 103 of the public wireless LAN to be connected. After the transmission of the request, the processing proceeds to step S1115.

In step S1204, the control unit 204 determines whether the camera 101 has received the authentication information generation request. If the camera 101 has received the authentication information generation request (YES in step S1204), the processing proceeds to step S1205. If the camera 101 has not yet received the authentication information generation request (NO in step S1204), the processing proceeds to step S1210. In step S1205, the camera 101 disconnects the wireless LAN connection with the cellular phone 102, and the processing proceeds to step S1206. In step S1206, based on the information of the AP 103, the control unit 204 connects the camera 101 to the AP 103 by the wireless LAN. Further, the camera 101 is connected to the authentication server 106 via the AP 103.

In step S1207, after the connection with the authentication server 106, the generation unit 217 generates the authentication information. If the generation unit fails in generating the authentication information, a message notifying the user of the error can be displayed. In step S1208, the generated authentication information is stored. In step S1209, the wireless LAN connection with the AP 103 is disconnected, and the acquisition processing of the authentication information ends.

In step S1109, the wireless LAN connection with the camera 101 is disconnected. Then, the processing proceeds to step S1110. In step S1110, the control unit 302 connects the cellular phone 102 to the AP 103 by the wireless LAN. Then, the cellular phone 102 is connected to the authentication server 106 via the AP 103. In step S1111, the generation unit 307 generates the authentication information. After the generation of the authentication information, the processing proceeds to step S1112. In step S1112, the wireless LAN connection with the AP 103 is disconnected. In step S1113, again the control unit 302 connects the cellular phone 102 to the camera 101 by the wireless LAN. Then, the processing proceeds to step S1114. In step S1114, the authentication information providing unit 308 provides the generated authentication information to the camera 101.

In step S1210, the control unit 204 determines whether the authentication information acquisition unit 214 of the camera 101 has received the authentication information. If the authentication information is received (YES in step S1210), the processing proceeds to step S1211. If the authentication information is not received in a predetermined period of time or a message indicating that the acquisition of the authentication information has failed is received (NO in step S1210), the processing proceeds to step S1212. In step S1211, the control unit 204 stores the received authentication information. In step S1212, the wireless LAN connection with the cellular phone 102 is disconnected. Then, the authentication information acquisition processing ends.

Similarly, in step S1115, the cellular phone 102 also disconnects the wireless LAN connection with the camera 101, and then the authentication information provision processing ends. By using the acquired authentication information, the camera 101 can be connected to the AP 103 by the wireless LAN. When the authentication processing is performed with the authentication server 106 and if the authentication is successful, the camera 101 can access the Internet 107.

According to the present embodiment, even if the connection processing is started by the cellular phone 102, the authentication information necessary in the connection to the public wireless LAN can be provided to the camera 101.

According to the present embodiment, after the control unit 302 of the cellular phone 102 determines whether the authentication information is necessary in step S1006, whether the authentication information can be provided to another apparatus is determined in step S1008. However, the determination can be made at different timing. For example, if the authentication information processing is performed in step S1012 and the authentication information is successfully generated, whether the authentication information can be provided to another apparatus can be determined at that time. If the authentication information is associated with the apparatus, since the authentication information cannot be provided to another apparatus, the determination processing of whether the authentication information can be provided to another apparatus is not performed.

Further, whether to provide the authentication information to another apparatus can be determined before the connection processing is started. In this case, step S1008 is skipped and the provision processing of authentication information in step S1015 is performed.

Although the terminal that generates the authentication information is determined by the apparatus that starts the connection processing (the camera 101 or the cellular phone 102) according to the exemplary embodiments described above, the generation terminal of the authentication information can be determined by another apparatus (the cellular phone 102 or the camera 101). In such a case, after the wireless LAN connection with another apparatus, the public wireless LAN information of the public wireless LAN which has been selected as the wireless LAN to be connected by the apparatus that started the connection processing and the apparatus capability information of the apparatus that started the connection processing is transmitted to the other apparatus. Based on the public wireless LAN information, the apparatus capability information which the apparatus that started the connection processing possesses, and the apparatus capability information of another apparatus, the determination processing is performed by another apparatus.

Accordingly, the authentication information used for the authentication with the authentication server can be acquired from another communication apparatus. Thus, even if the user interface of the apparatus is not appropriate for the input operation, the network authentication can be performed using the authentication information. Further, since the processing for determining the terminal which is to generate the authentication information does not need to be performed by the apparatus that started the connection processing, the processing load of the apparatus that started the connection processing can be reduced.

According to a third exemplary embodiment of the present invention, when the SSID of the connectable public wireless LAN is displayed on the display of the camera 101 and the user selects the public wireless LAN to be connected in step S505, if it is determined that a cellular phone does not exist in the vicinity, the SSID of the public wireless LAN whose authentication information is not possessed is not displayed.

The network configuration according to the third exemplary embodiment is similar to the configuration illustrated in FIG. 1 except that the cellular phone 102 is not included in the network configuration.

Figure 13:
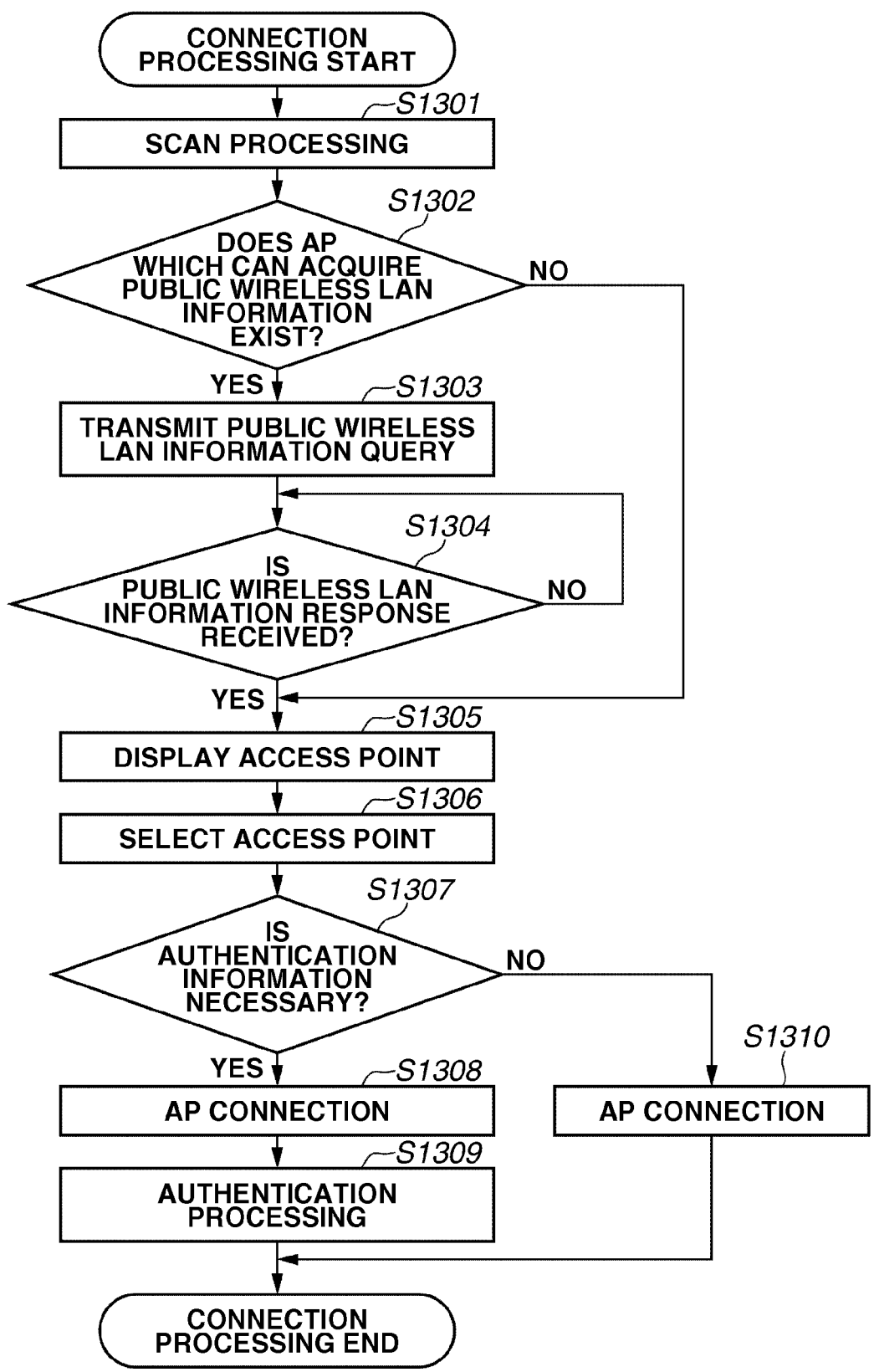
FIG. 13 is a flowchart illustrating connection processing performed by the camera according to a third exemplary embodiment of the present invention.

FIG. 13 is a flowchart illustrating the connection processing of the camera 101 according to the present embodiment. Since steps S1301 to S1304 are similar to steps S501 to S504 in FIG. 5 according to the first exemplary embodiment, their descriptions are not repeated.

In step S1305, the control unit 204 displays the public wireless LAN information to be connected on the display unit 202 when the public wireless LAN to be connected is displayed, whether a cellular phone exists in the vicinity is determined.

Whether a cellular phone exists in the vicinity is determined, for example, by using a SSID of the second wireless LAN 105 of the camera 101 and the cellular phone 102. The SSID of the second wireless LAN 105 is stored in advance in the camera 101. When the scan processing in step S1301 is performed, whether a cellular phone exists in the vicinity is determined according to whether the SSID of the second wireless LAN 105 is found. Instead, the scan processing can be performed again.

If the terminal in the vicinity provides information of its device type by a frame of the wireless LAN, whether a cellular phone exists in the vicinity can be determined according to the device type.

Further, whether a cellular phone exists in the vicinity can be determined by obtaining history information regarding the connection with the cellular phone over the wireless LAN. In this case, if the time that passed from the latest disconnection is within a predetermined period of time, it is assumed that a cellular phone exists in the vicinity.

If a cellular phone does not exist in the vicinity, the SSID of the public wireless LAN whose authentication information is not possessed is not displayed as the public wireless LAN which can be connected.

The SSID of the public wireless LAN that possesses the authentication information and the SSID of the public wireless LAN that does not require the authentication information are displayed as the SSIDs of the public wireless LAN which can be connected. When these SSIDs are displayed, they can be displayed together with a wireless LAN which is not a public wireless LAN.

Further, regarding the display of the public wireless which can be connected, even if the authentication information is not possessed, whether the authentication information can be generated by the camera 101 alone is determined based on the public wireless LAN information, and the SSID of the AP of the public wireless LAN whose authentication information can be generated can be displayed.

If it is determined that a cellular phone exists in the vicinity, a SSID of a public wireless LAN which does not possess the authentication information can also be displayed as a SSID of a connectable public wireless LAN.

Regarding the display method, a SSID of a public wireless LAN whose authentication information is not possessed may be in a gray-out state when it is displayed such that it cannot be selected by the user.

Since steps S1306 to S1310 correspond to steps S505 to S506 and steps S511 to S513 according to the first exemplary embodiment, their descriptions are not repeated.

According to the above-described exemplary embodiment, the authentication information used for the authentication with the authentication server can be acquired from another communication apparatus. Thus, even if the user interface of the apparatus is not appropriate for the input operation, the network authentication can be performed using the authentication information. Further, by determining that the generation of the authentication information by the camera 101 is difficult in advance, the generation processing of the authentication information by the camera 101 will become unnecessary. Accordingly, the user does not need to perform useless operation.

According to each of the above-described exemplary embodiments, although a wireless LAN that conforms to IEEE 802.11 is used for the wireless communication between the camera and the cellular phone, the present invention is not limited to the example described above. For example, a wireless communication medium for wireless universal serial bus (USB), Multiband Orthogonal Frequency Division Multiplexing (OFDM) Alliance (MBOA), Bluetooth (registered trademark), Ultra-wideband (UWB), ZigBee, and Near Field Communication can be used. Further, a wired communication medium such as a wired LAN can be used between the camera and the cellular phone. The UWB includes wireless USB, wireless 1394, and WiNET.

In each of the above-described exemplary embodiments, although a cellular phone is used as an example of a mobile terminal used for generating the authentication information, the mobile terminal is not limited to a cellular phone. For example, a smartphone or a personal handyphone system (PHS), or a computer can be used. Further, although a camera is described as an example of an apparatus that acquires the authentication information, the apparatus can be, for example, a game machine, a printer, a toy, or a health appliance.

Further, according to each of the above-described exemplary embodiments, although the authentication server 106 can generate and register the authentication information as its functions, an authentication information generation server which generates and registers the authentication information can be used in addition to the authentication server 106. In such a case, although the generation of the authentication information will be performed by the authentication information generation server, regarding the authentication processing performed with the authentication server 106 in the preceding stage, the camera 101 can be temporarily authenticated by using arbitrary authentication information. In such a case, the camera 101 is permitted to access only the authentication information generation server. By using such a method, the present embodiment can also be applied.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)Tm), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-106118 filed May 7, 2012, which is hereby incorporated by reference herein in its entirety.

What is claimed is:

1. A communication apparatus comprising:
a processor; and
a memory having instructions for execution to cause the processor to:
detect a wireless network created by a base station;
acquire identification information of a provider of the detected wireless network;
determine whether the communication apparatus possesses authentication information which corresponds to the identification information and is used for authentication with an authentication server so as to connect with the detected wireless network;
provide another communication apparatus with the acquired identification information if the communication apparatus does not possess the authentication information;
acquire the authentication information corresponding to the provided identification information from the another communication apparatus if the another communication apparatus possesses the authentication information;
perform a process for generating the authentication information if the another communication apparatus does not possess the authentication information; and
perform the authentication with the authentication server using the acquired or the generated authentication information.

2. The communication apparatus according to claim 1, wherein the memory has further instructions for execution to cause the processor to:
select a wireless network to be connected by the communication apparatus based on the detected wireless network; and
acquire the authentication information used for the authentication with the authentication server which performs authentication for the selected wireless network.

3. The communication apparatus according to claim 2, wherein the memory has further instructions for execution to cause the processor to:
determine whether the authentication is to be performed with the authentication server for the selected wireless network, and
acquire the authentication information if the authentication is performed with the authentication server.

4. The communication apparatus according to claim 3, wherein the memory has further instructions for execution to cause the processor not to acquire the authentication information if the authentication is unnecessary.

5. The communication apparatus according to claim 1, wherein the memory has further instructions for execution to cause the processor to:
determine a type of the authentication information used for the authentication with the authentication server; and
acquire predetermined information according to the determined type.

6. The communication apparatus according to claim 1, wherein the memory has further instructions for execution to cause the processor to:
determine whether the communication apparatus generates the authentication information or another communication apparatus generates the authentication information'
acquire the authentication information if another communication apparatus generates the authentication information; and
acquire predetermined information for generating the authentication information from another communication apparatus if the communication apparatus generates the authentication information.

7. The communication apparatus according to claim 6, wherein if charging does not occur in generating the authentication information, the communication apparatus determines that the communication apparatus generates the authentication information.

8. The communication apparatus according to claim 6, wherein the communication apparatus determines whether the communication apparatus generates the authentication information or another communication apparatus generates the authentication information according to whether the communication apparatus can perform the authentication with the authentication server using the authentication information generated by another communication apparatus.

9. The communication apparatus according to claim 1, further comprising:
a display unit configured to display information of the detected wireless network,
wherein the display unit does not display information of a wireless network whose authentication information is not possessed by the communication apparatus as a connectable network.

10. The communication apparatus according to claim 1, further comprising:
a display unit configured to display information of the detected wireless network,
wherein the display unit does not display information of a wireless network whose authentication information is not possessed by the communication apparatus and a network whose authentication information cannot be generated by the communication apparatus as a connectable network.

11. A control method for a communication apparatus, the method corresponding to a program stored in a memory and executed by a processor, the method comprising:
detecting a wireless network created by a base station;
acquiring identification information of a provider of the detected wireless network;
determining whether the communication apparatus possesses authentication information which corresponds to the identification information and is used for the authentication with an authentication server so as to connect with the detected wireless network;
providing another communication apparatus with the acquired identification information if the communication apparatus does not possess the authentication information;
acquiring the authentication information corresponding to the provided identification information from the another communication apparatus if the another communication apparatus possesses the authentication information;
performing a process for generating the authentication information if the another communication apparatus does not possess the authentication information; and performing the authentication with the authentication server using the acquired or the generated authentication information.

12. A non-transitory storage medium storing a computer program executable by a processor of a communication apparatus, the program comprising:
- detecting a wireless network created by a base station;
- acquiring identification information of a provider of the detected wireless network;
- determining whether the communication apparatus possesses authentication information which corresponds to the identification information and is used for the authentication with an authentication server so as to connect with the detected wireless network;
- providing another communication apparatus with the acquired identification information if the communication apparatus does not possess the authentication information;
- acquiring the authentication information corresponding to the provided identification information from the another communication apparatus if the another communication apparatus possesses the authentication information;
- performing a process for generating the authentication information if the another communication apparatus does not possess the authentication information; and
- performing the authentication with the authentication server using the acquired or the generated authentication information.

13. The communication apparatus according to claim 1, wherein the identification information is realm information.

* * * * *